Nov. 12, 1940.  C. T. PFLUEGER  2,221,168
FLOAT
Filed March 20, 1937
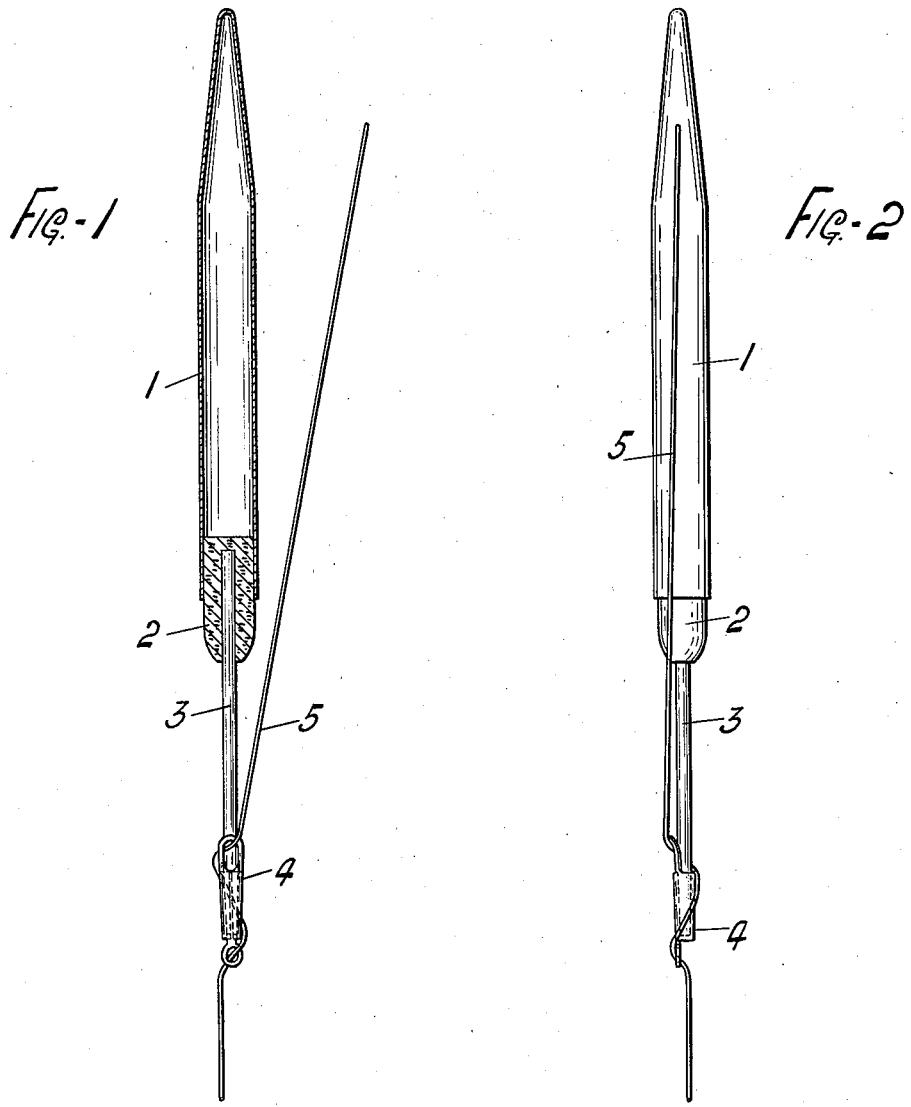
INVENTOR
CHARLES T. PFLUEGER
BY
Albert L. Ely
ATTORNEY Patented Nov. 12, 1940

2,221,168

UNITED STATES PATENT OFFICE 2,221,168

FLOAT

Charles T. Pflueger, Akron, Ohio, assignor to The Enterprise Manufacturing Company, Akron, Ohio, a corporation of Ohio Application March 20, 1937, Serial No. 132,111

1 Claim. (Cl. 43—49)

The present invention relates to the art of fishing and particularly to the construction of floats such as used in still fishing.

One of the objects of the invention is to simplify and improve upon the construction of hollow floats and to reduce the cost of manufacture. It is also an object of the invention to construct a float which is much more sensitive than floats of prior constructions and which is kept upright in the water with less weight upon the line. This is a very desirable result as less weight in sinkers is required to maintain the float in its proper position.

These results are due to the improved construction and design of the float and to the fact that it has less surface contact with the water than standard float constructions.

In the drawing and in the description, the best known and preferred form of construction has been disclosed, but it will be understood that changes and modifications may be made therein without sacrificing any of the benefits of the invention or departing in any way from the spirit and scope of the invention as defined in the claim.

In the drawing:

Fig. 1 is a view of the improved float with the body in section; and

Fig. 2 is a side view of the improved float.

The float consists of the hollow tubular body 1, the upper end of which is tapered as shown. This body is preferably made of Celluloid or some other plastic substance which should be light in weight and easily formed. The lower end of the body is closed by a cork stopper 2 in which is secured the stick or quill 3. At the lower end of the quill or stick is attached a metal clip 4 to which the line 5 is fastened. The details of the clip are not an essential part of the present invention, this element being covered in my prior U. S. Patent No. 2,127,667 issued August 23, 1938.

In all other float constructions which employ hollow tubes of Celluloid or the like, it has been the practice to make them of two Celluloid tubes connected to a central member. By the design shown, only one tube is necessary, which not only reduces the cost of manufacture, but also the weight of the float, giving it greater sensitivity. By actual comparative tests, it has been demonstrated that several less shot are required to cause the float to stand upright in the water. This is a very substantial advantage in still fishing. The stick offers less resistance or capillary attraction to the water and that adds to the sensitiveness of the float body.

What is claimed is:

A float for fishing consisting of a hollow buoyant tube closed at its upper end, a stopper of buoyant material inserted in the lower end of the tube to form a hollow closed chamber, a slender buoyant member of smaller area than said tube mounted in said stopper and projecting axially downwardly therefrom, and means carried on the lower end of the last mentioned member to which a line may be attached, said float being adapted to stand upright in the water and having sufficient buoyancy to support that end of the fishline to which a hook is attached.

CHARLES T. PFLUEGER.